UNITED STATES PATENT OFFICE.

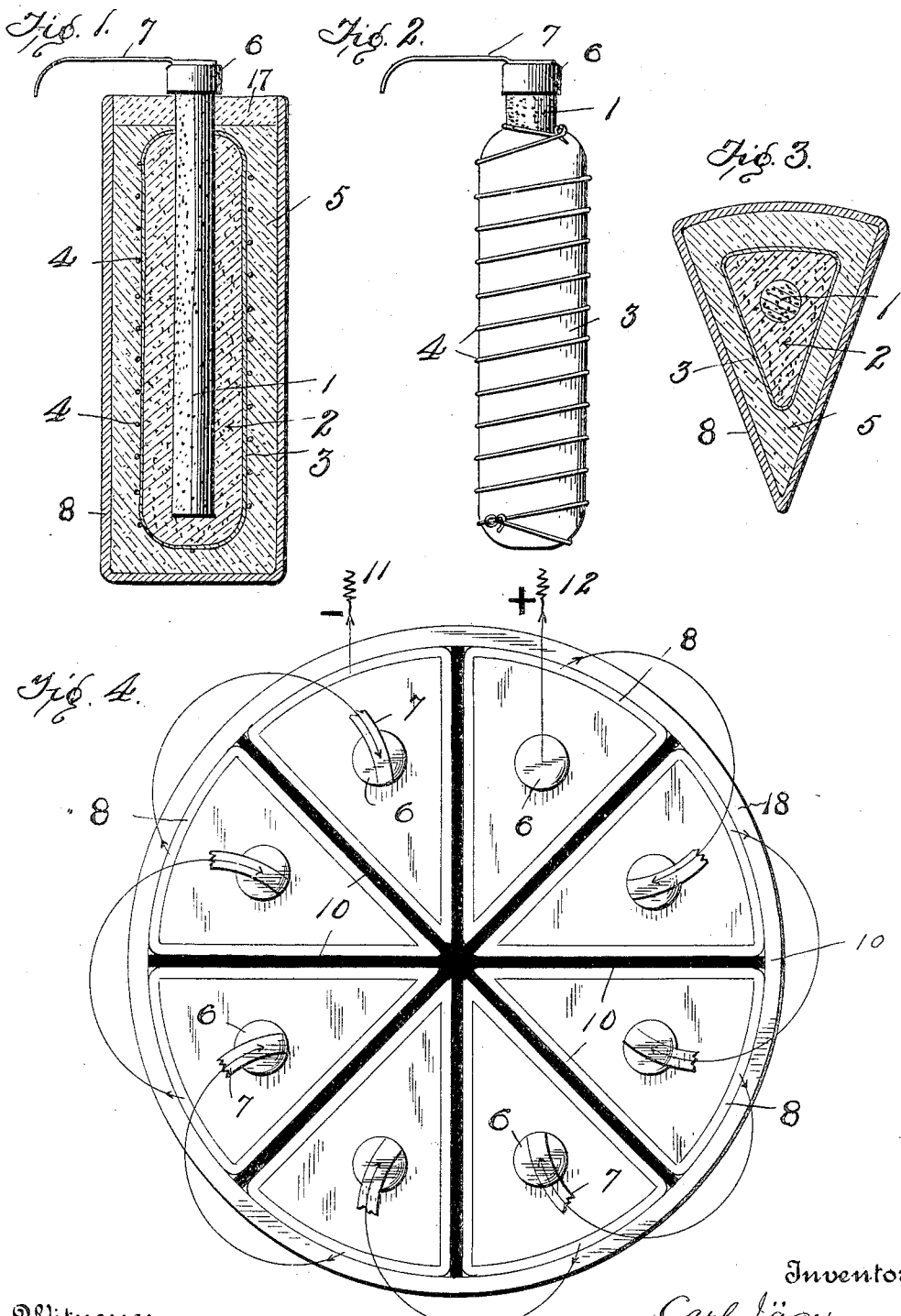

CARL JÄGER, OF ROCK ISLAND, ILLINOIS, ASSIGNOR, BY DIRECT AND MESNE ASSIGNMENTS, TO ROCK ISLAND BATTERY COMPANY, A CORPORATION OF NEW JERSEY.

ELECTRICAL BATTERY.

No. 808,755.     Specification of Letters Patent.     Patented Jan. 2, 1906.

Application filed February 27, 1904. Serial No. 195,618.

*To all whom it may concern:*

Be it known that I, CARL JÄGER, a citizen of Germany, residing at Rock Island, in the county of Rock Island and State of Illinois, have invented certain new and useful Improvements in Electrical Batteries, of which the following is a specification.

This invention relates to permanent or so-called "dry" electrical batteries.

The object of the invention is to produce a battery which may be carried or stored in any position and which will be able to develop electrical energy for many months without recharging.

The invention consists in a dry battery composed of the elements and assembled in the manner substantially as hereinafter described.

Figure 1 is a vertical section of a cell of a dry battery such as is hereinafter described. Fig. 2 is an elevation of the porous solid core of one of the battery-cells. Fig. 3 is a horizontal section of one of the battery-cells, and Fig. 4 is a top plan of the entire battery of cylindrical form.

To construct the battery, I take the following ingredients: of ammonia calcidium, (a German compound composed of ammonium chlorid 44.3 per cent., calcium chlorid thirty per cent., mercuric chlorid .7 per cent., water twenty-five per cent.,) about two pounds; of cyanoxid, (ferrocyanid of potash,) about two hundred and thirty grains; of alcohol, about five hundred and fifty grains; of chlorid of zinc, two pounds. This gives an acid composition.

To the above composition, which I call "compound No. 1," I add pulverized brownstone, (peroxid or dioxid of manganese,) iron-filings, and powdered graphite in about equal proportions until the compound reaches the consistency of a pasty mass. I take a carbon pencil 1 of the character well known in electrical appliances and surround said pencil with the pasty mass described, as at 2. Preferably the paste is packed about the pencil in a mold of the form of one of the battery-cells, but of less diameter. . The paste and pencil are removed from the mold when somewhat hardened, and this porous body is then inclosed in a wrapping or envelop 3 of light porous fabric and wrapped with twine 4 to hold the body in form and prevent breaking or scaling. A quantity of compound No. 1 is then taken and mixed with wheat flour and plaster-of-paris. The carbon pencil, with its surrounding body and envelop, is then placed in the mixture No. 1 for some twenty minutes until it has absorbed a considerable quantity of the acid mixture. The carbon body is then placed in a zinc cup of the form desired and the space between the carbon body and the zinc cup is filled with the acidulated flour and plaster-of-paris, as indicated at 5, Fig. 1. Preferably the space between the carbon body and the zinc cup will be partly filled with acid solution or mixture No. 1 before the filling 5 of flour and plaster is applied. The carbon pencil 1 projects at one end from the body 2. To the projecting end a metallic cup or ferrule 6 is applied and a metallic connecting wire or strip 7 is connected to this metallic cup or ferrule. This strip 7 connects to the zinc cup of the next cell when a number of cells are connected.

The zinc cup 8 is preferably of such form that a number of them can be assembled or nested. The cylindrical sectors indicated in Figs. 3 and 4 form very convenient battery-cups.

The carbon pencil 1 extends above the body 2, and this body 2 does not reach quite to the top of the cup 8. The space above body 2 and around pencil 1 is filled in with paraffin or similar material 17, to insulate the parts and hold the body firmly in place.

When a number of cells are assembled to form a battery of several cells, strips of pasteboard 10 are inserted between the cells to hold them out of contact. The carbon of one cell is connected to the zinc of the next, as indicated by the arrows in Fig. 4, the first zinc element and the last carbon element having terminal connections 11 and 12, from which electrical connection may be made.

In Fig. 4 the metallic connections from the carbon pencils to zinc cups are indicated by lines and arrow-heads, as it is obvious that these connections can be made from any part of the cups, as is usual in this class of batteries.

The series of battery-cells can be conveniently inclosed in a cylindrical box 18 and It is believed the development of electrical energy is caused by the combination of the chemical agents employed.

What I claim is—

1. A battery-cell having a zinc cup, a carbon pencil within the cup, a compound of dioxid of manganese, iron-filings, and powdered graphite surrounding the carbon pencil, and a filling of flour and plaster-of-paris between the cup and the inclosed body.

2. A battery-cell consisting of a zinc cup, a carbon pencil centrally located in said cup and extending above the same, a porous compound of dioxid of manganese, iron-filings, and powdered graphite surrounding said pencil and containing in solution "ammonia calcidium," ferrocyanid of potash, alcohol, and chlorid of zinc.

3. In a battery-cell, a carbon pencil, a body of graphite, dioxid of manganese, and iron- nections between the cup of one cell and the carbon of the next cell, all combined.

5. In a dry battery, an inclosing cylindrical casing, a series of zinc cups in form of sectors of a cylinder inclosed in said casing, insulating-partitions between the cups, a carbon pencil centrally supported in each cup and a porous body saturated with acid filling the interval, metallic connections from the zinc of one cup to the carbon of the next cell in series, a non-conducting plastic covering for each of the cells, and suitable terminals, all combined.

In testimony whereof I affix my signature in presence of two witnesses.

CARL JÄGER.

Witnesses:
  MYER A. LOEB,
  N. A. LARSON.